G. Scott,
Bread Machine,
Nº 30,764. Patented Nov. 27, 1860.
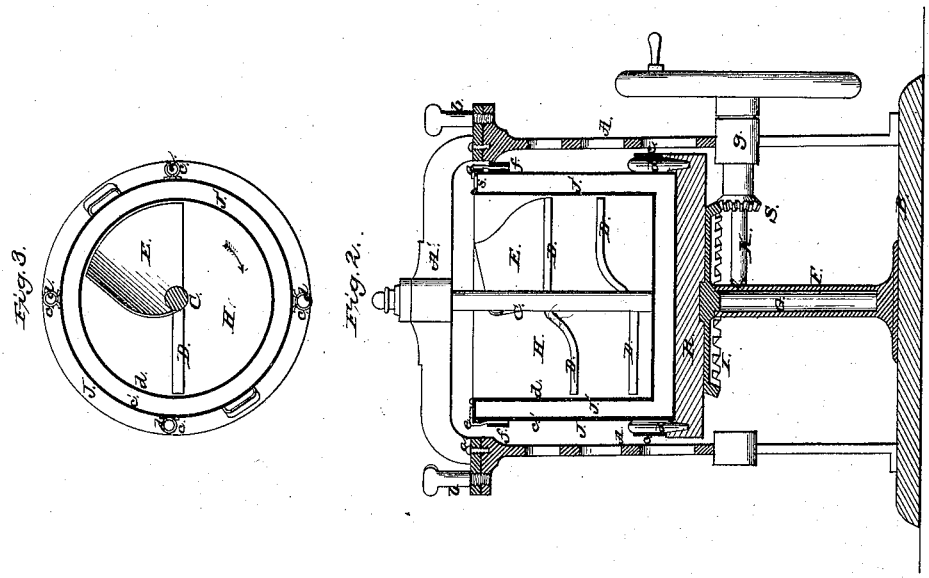
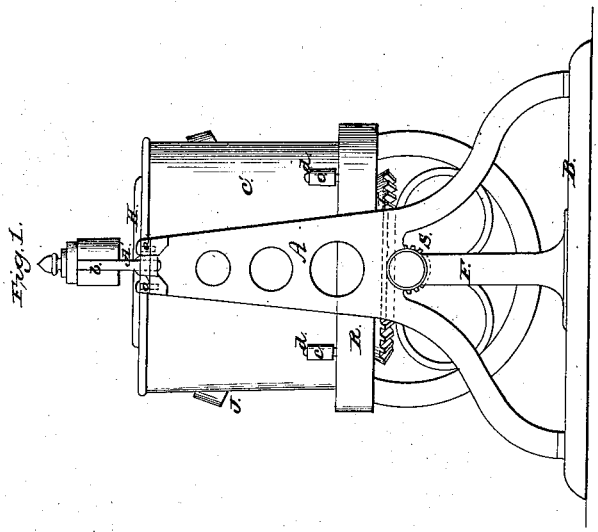
Attest:
Inventor:
George Scott
by Robt W Fenwick
Attorney

UNITED STATES PATENT OFFICE.

GEORGE SCOTT, OF STEUBENVILLE, OHIO.

MACHINE FOR RAISING AND KNEADING DOUGH.

Specification of Letters Patent No. 30,764, dated November 27, 1860.

*To all whom it may concern:*

Be it known that I, GEORGE SCOTT, of Steubenville, in the county of Jefferson and State of Ohio, have invented a new and useful Improvement in Machines for Kneading Bread-Dough; and I do hereby declare that the following is a full, clear, and exact description of the same, reference being had to the accompanying drawings, forming a part of this specification, in which—

Figure 1, is a side elevation, Fig. 2, a vertical central section, and Fig. 3, a horizontal section of my improved machine.

Similar letters of reference, in each of the figures, indicate corresponding parts.

The nature of my invention consists, first, in a stationary shaft having arms or knives and a spiral deflecting flanch or plate projecting from it, in combination with a revolving dough reservoir, substantially in the manner and for the purposes hereinafter described. It consists, second, in the combination of the hot water or vapor reservoir J, J', dough reservoir H, flanch E, and kneading arms or knives D—substantially as hereinafter described.

To enable others, skilled in the art, to make and use my invention, I will proceed to describe its construction and operation.

A, A', represent a strong frame bolted to a platform or table B. The upper yoke piece A', of this frame is made separate from the portion A, but is united with the same by means of dowels *a, a,* and screw bolts *b, b,* as shown.

C, is a pendent bar, projecting down from the center of the yoke piece A'. This bar has bent arms or knives D, D, projecting from its circumference, and also a spiral flanch E, as represented.

F, is a vertical socket step projecting from the center of the platform or table. In this socket, a vertical shaft G, is fitted snugly, but so as to be allowed a free chance to revolve. The shaft G, supports, on its upper end, a disk R, to which, by means of loops *c, c,* and pins *d, d,* is connected a cylindrical reservoir H, J, said reservoir being set down into the disk and having two walls with a space J', existing between them. The outer wall *c'*, is made separate from the inner one *d*, but is connected therewith by means of lugs *e*, and loops *f*, as represented.

I, is a bevel toothed wheel bolted to the under surface of the disk R.

K, is a horizontal driving shaft; one of its ends has a bearing in the circumference of the socket step F, while its other end is fitted to the turn in a box *g*, of the frame A. The shaft K, has a small bevel wheel S, arranged upon it, said wheel gearing with the bevel wheel I, and thereby giving a rotary motion to reservoir H, J.

To use our invention, the arch portion A', of the frame and the bar and its arms and deflecting spiral flanch, are removed; next the reservoir is taken out and the yeast and flour introduced into the reservoir H. When this is done, the warm water or steam is introduced into the space J', between the two vessels through the plug holes. This being done the reservoir is set near a stove or fire, so that one side of the outside vessel shall be exposed to the heat and the action of the heat be distributed equally and uniformly around the inner vessel by the water or vapor between the vessels. When the sponge or dough has risen properly, the reservoir is again put in the machine and the arch or kneading attachments replaced and fastened securely; the machine is now put in operation and worked for about twenty-five to thirty minutes, when the reservoir is again taken out and set by the stove or fire until the dough rises sufficiently to form it into loaves ready for baking in the oven. It is sometimes necessary to withdraw the water which was first introduced, and to put in warmer water at the time when the reservoir is taken out of the machine to effect the second raising of the dough.

In the drawing, the spiral flanch is set so as to require that the driving shaft K, be turned toward the operator, but in practice it should be set in a reverse position.

By turning the shaft, the reservoir is revolved and the dough carried through the stationary arms or knives of the bar C, and against the surface of the spiral flanch E. The action of the arms or knives upon the dough is very similar to that experienced by it when kneaded with the hands, while the action of the spiral deflecting flanch is to force it downward and compact it together, ready for a second passage through the arms or knives.

My machine is very simple and greatly lessens the time and labor expended in kneading or sponging dough for bread.

What I claim as my invention and desire to secure by Letters Patent, is—

1. A stationary shaft C, having arms or knives D, D, and a deflecting flanch or plate E, projecting from it, in combination with a revolving dough reservoir H substantially as and for the purposes set forth.

2. The combination of the hot water or vapor reservoir J, J', dough reservoir H, flanch E, and kneading arms or knives D, substantially as and for the purposes set forth.

The foregoing specification of my machine for kneading bread-dough signed and witnessed this 5th day of Nov. 1860.

GEORGE SCOTT.

Witnesses:
JOSHUA HARRISON,
ROBERT W. LONG.